United States Patent [19]

Yamaguchi et al.

[11] 4,340,796
[45] Jul. 20, 1982

[54] WIRELESS TEMPERATURE-SENSING SYSTEM INCLUSIVE OF THERMALLY-RESPONSIVE OSCILLATOR

[75] Inventors: Masumi Yamaguchi, Ikoma; Kenji Kawabata, Nara; Yoshimi Kumagai, Tenri, all of Japan

[73] Assignee: Sharp Kabushiki Kaisha, Osaka, Japan

[21] Appl. No.: 70,730

[22] Filed: Aug. 29, 1979

[30] Foreign Application Priority Data

Aug. 31, 1978 [JP] Japan .................................. 53-107989
Sep. 12, 1978 [JP] Japan .................................. 53-112717

[51] Int. Cl.³ .......................... H05B 6/68; G01K 7/32
[52] U.S. Cl. ............................... 219/10.55 B; 219/516; 324/61 QL; 374/117; 374/149; 374/155
[58] Field of Search .............. 219/10.55 B, 10.55 E, 219/10.55 D, 516; 310/311, 341, 343; 73/339 A, 352; 324/61 QL, 61 QS

[56] References Cited

U.S. PATENT DOCUMENTS

| | | | |
|---|---|---|---|
| 2,721,267 | 10/1955 | Collins | 310/341 X |
| 3,303,701 | 2/1967 | Matsuura et al. | 324/61 QL X |
| 3,906,340 | 9/1975 | Wingfield et al. | 324/61 QS X |
| 4,081,645 | 3/1978 | Javes et al. | 219/516 X |
| 4,230,731 | 10/1980 | Tyler | 219/10.55 B X |
| 4,297,557 | 10/1981 | Tyler et al. | 219/10.55 B |

FOREIGN PATENT DOCUMENTS

| | | |
|---|---|---|
| 1904853 | 9/1969 | Fed. Rep. of Germany .... 73/339 A |
| 2719588 | 11/1977 | Fed. Rep. of Germany ... 219/10.55 B |
| 53-64844 | 6/1978 | Japan .......................... 219/10.55 B |
| 53-64847 | 6/1978 | Japan .......................... 219/10.55 B |

OTHER PUBLICATIONS

*TMS 1117IL 4-Bit Microcomputer Preprogrammed Microwave Oven Controller Manual;* Texas Instruments, Inc., 1976.
*Instrumentation & Experimental Technology*, (U.S.A.); No. 3; May/Jun. 1970; "Quartz Frequency Thermometer" by Smagin et al.

Primary Examiner—J. V. Truhe
Assistant Examiner—Keith E. George
Attorney, Agent, or Firm—Birch, Stewart, Kolasch and Birch

[57] ABSTRACT

A wireless temperature-sensing assembly adapted for a cooking apparatus such as a microwave oven, comprises a wireless communication element and a sensing probe. The wireless communication element provides electromagnetic waves over an oven cavity of the cooking apparatus. The sensing probe selects a particular frequency of the electromagnetic waves. The sensing probe contains an oscillator element resonance frequencies of which vary depending on the surrounding temperature. The wireless communication element further receives and detects the particular frequency of the electromagnetic waves defined by the selecting means. In a specific form, the wireless communication element provides the electromagnetic waves the frequencies of which vary from time slot to time slot. The oscillator element may be composed of crystal, ceramic, or the like. The resonance frequencies of the oscillator element change due to variation in its number of proper vibrations dependent on the surrounding temperature.

18 Claims, 7 Drawing Figures

WIRELESS TEMPERATURE-SENSING SYSTEM INCLUSIVE OF THERMALLY-RESPONSIVE OSCILLATOR

BACKGROUND OF THE INVENTION

The present invention relates in general to a temperature-sensing system adapted for a cooking apparatus and, more particularly, to a wireless temperature-sensing system for a cooking untensil.

Recently, there have been provided cordless temperature monitor system for detecting an inner temperature of a foodstuff placed within a cooking apparatus such as a microwave oven. Such a cooking probe as applied the cordless monitoring system was disclosed in, for example, U.S. Pat. No. 4,089,222 issued May 16, 1978, entitled "TEMPERATURE TELEMETRY FOR A SETTABLE COOKING PROBE".

In the conventional cordless monitoring system, however, a power source was needed within the cooking probe to provide control signals indicative of the inner temperature. The provision of the power battery resulted in a considerable increase in the volume and cost of the cooking probe as compared to its limited usefulness.

Therefore, there has been a desire to eliminate the power battery from the cooking probe so as to make the cooking probe compact and to lower the cost of the cooking probe.

SUMMARY OF THE INVENTION

Accordingly, it is the primary object of the present invention to provide an improved cordless monitor system for sensing an inner temperature of an object processed within a cooking apparatus such as a microwave oven.

It is another object of the present invention to provide an improved cordless sensing probe for monitoring an inner temperature of an object placed within a cooking utensil such as a microwave oven.

It is a further object of the present invention to provide an improved cordless sensing probe having no power source therein for monitoring an inner temperature of an object placed within a cooking utensil such as a microwave oven.

It is a further object of the present invention to provide an improved wireless monitor system having an improved antenna element for transmitting a series of frequencies applied to a wireless sensing probe for monitoring an inner temperature of an object managed within a cooking utensil.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a wireless temperature-sensing assembly adapted for a cooking apparatus such as a microwave oven, comprises a wireless communication element and a sensing probe. The wireless communication element provides electromagnetic waves over an oven cavity of the cooking apparatus. The sensing probe selects a particular frequency of the electromagnetic waves. The sensing probe contains an oscillator element, resonance frequencies of which vary depending on the surrounding temperature. The wireless communication element further receives and detects a particular frequency of the electromagnetic waves defined by the selecting means.

In a specific form, the wireless communication element provides the electromagnetic waves, the frequencies of which vary from time slot to time slot. The oscillator element may be composed of a crystal, ceramic, or the like. The resonance frequencies of the oscillator element change due to variations in its number of proper vibration dependent on the surrounding temperature. The oscillator element is added to a resonance circuit so as to increase the Q of the resonance circuit.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

Primarily, an application of the present invention is not limited to a microwave oven although so indicated throughout the drawings. The present wireless monitoring system can be readily applied to any cooking utensil such as a gas oven, an electric heating oven, and a combination of a microwave oven and other heat-source ovens. For convenience of description, the present invention is described hereinafter with reference to the microwave oven.

Figure 1:
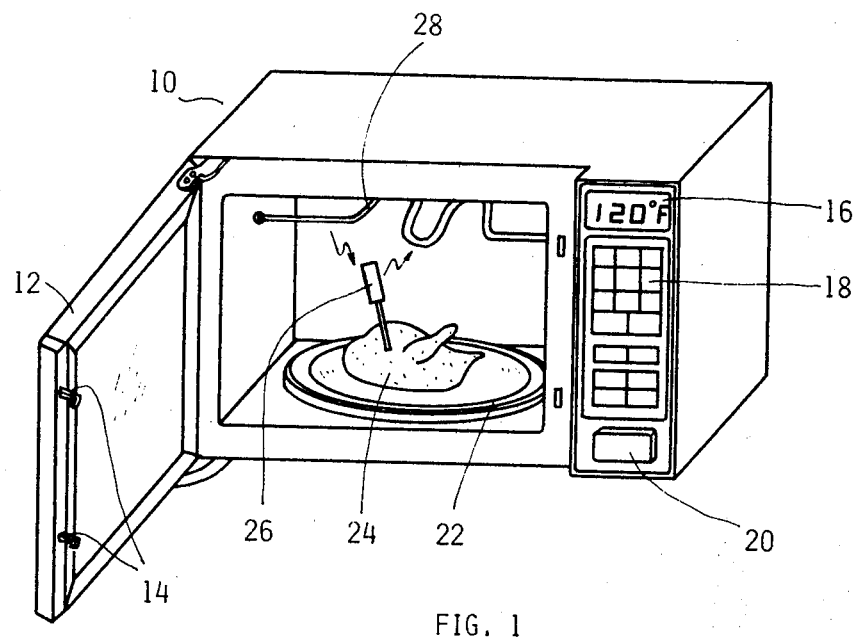
FIG. 1 is a perspective view of a cooking utensil, in particular, a microwave oven according to the present invention.

FIG. 1 shows a perspective view of a microwave oven 10 containing a wireless communication system according to the present invention. The microwave oven 10 comprises a door 12, door latch elements 14, a turntable 22, a door-open switch 20, and a control panel unit containing a key input unit 18 and a display 16. A foodstuff 24 is disposed on the turntable 22. A sensing probe 26 is inserted into the foodstuff 24 to monitor an inner temperature of the foodstuff 24. A sheath heater 28 as a browner is used to cause wireless communication in relation with the sensing probe 26.

Figure 2:
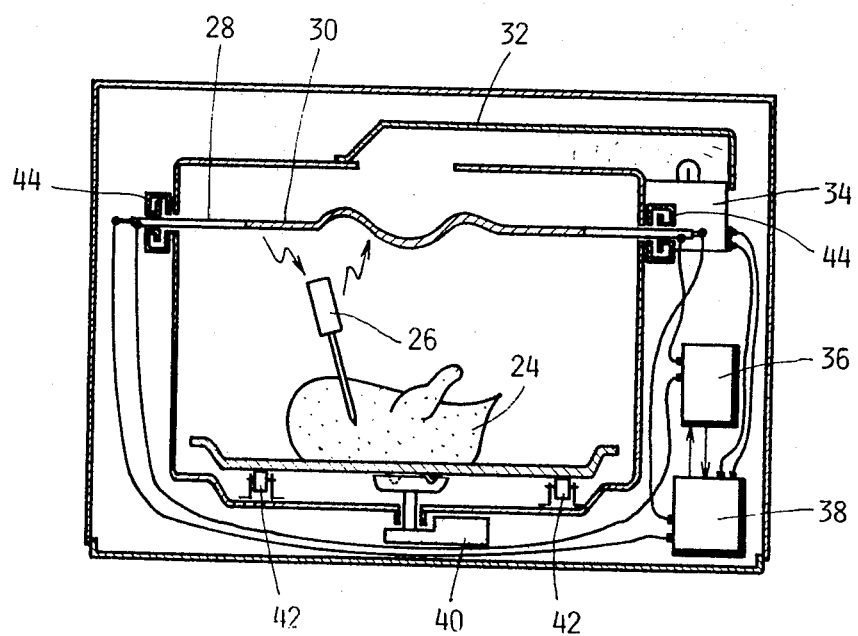
FIG. 2 is a cross-sectional view of the cooking utensil shown in FIG. 1.

FIG. 2 shows a cross-sectional view of the microwave oven 10. There are provided within the microwave oven 10, the sensing probe 26 inserted into the foodstuff 24, the sheath heater 28 containing a heating element 30, a wave guide 32, a magnetron 34, a wireless communication unit 36, a power control unit 38, a turntable motor 40, a pair or supporting rollers 42, and a pair of choke housings 44.

In addition to a conventional microwave oven, there is provided within the microwave oven 10 a wireless communication system according to the present invention for monitoring an inner temperature of the foodstuff 24. The wireless communication system comprises the sheath heater 28, the wireless communication unit 36, and the sensing probe 26.

The wireless communication unit 36 provides a series of signals in a like manner as in the well known, for example, a Phase Lock Loop (PLL) system using a Voltage Controlled Oscillator (VCO). This PLL-VCO system is featured by producing the series of signals, the frequency of which increases accurately by a predetermined degree, say, about 1 KHz for each lapse of a certain period of time, for example, about 8.3 msec according to an example of the present invention. The sheath heater 28 is provided for transmitting the series of signals from the wireless communication unit 36 to the sensing probe 26. The inner temperature of the foodstuff 24 is monitored by means of the wireless communication system as described below.

Figure 3:
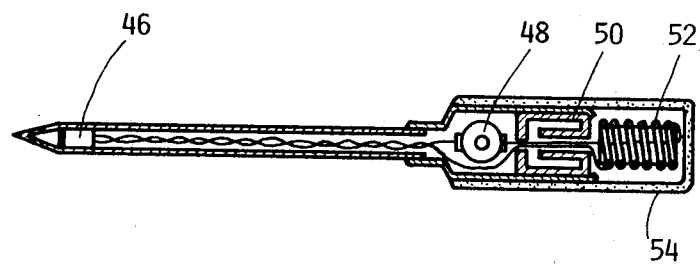
FIG. 3 is a cross-sectional view of a sensing probe adapted for a wireless monitor system of the present invention.

FIG. 3 illustrates an inner structure of the sensing probe 26. There are provided a crystal oscillator 46, a trimmer condenser 48, a choke structure 50, and a coil antenna 52, and a cover 54.

The crystal oscillator 46 is disposed at the tip of the sensing probe 26. The tip should be inserted into the center portions of the foodstuff 24. On the other hand, all of the trimmer condenser 48, the choke structure 50, and the coil antenna 52 are disposed at the other portions of the sensing probe 26. The coil antenna 52 receives the series of signals from the sheath heater 28. Then it delivers signals of the resonance frequencies toward the sheath heater 28.

The crystal oscillator 46, the trimmer condenser 48, coil antenna 52 form in combination an LC resonance circuit. The LC resonance circuit is activated in response to a particular series of signals developed from the wireless communication unit 36, the frequency of which agrees with the resonance frequency of the LC resonance circuit. The resonance frequency varies according to the inner temperature of the foodstuff 24 since the crystal oscillator 46 has a resonance frequency dependent on a temperature of the foodstuff as described below. The signals of the resonance frequency of the LC resonance circuit are received by means of the sheath heater 28 and detected with the aid of the wireless communication unit 36. The choke structure 50 is needed to prevent microwave signals from invading into the internal circuit elements of the sensing probe 26.

Figure 4:
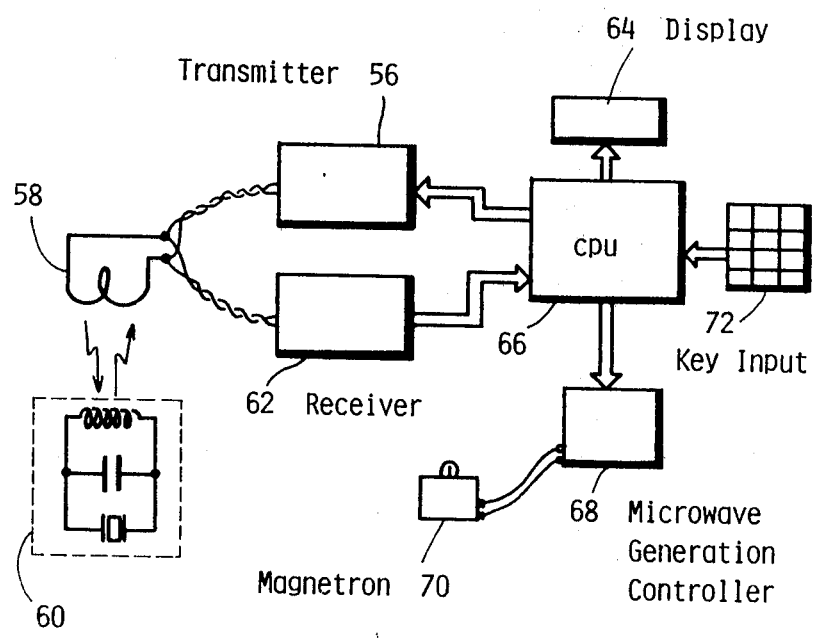
FIG. 4 is a block diagram of the wireless monitor system according to the present invention.

FIG. 4 shows a principle block diagram of the present wireless communication system. The wireless communication system comprises an antenna 58, an LC resonance circuit 60, a transmitter 56, a receiver 62, a central processing unit (CPU) 66, a display 64, a key input unit 72, a microwave generation controller 68, and a magnetron 70.

The antenna 58 is related to the sheath heater 28 of FIGS. 1 and 2. The LC resonance circuit 60 is the same as the LC resonance circuit mentioned with reference to FIG. 3.

The transmitter 56, the receiver 62, and the CPU 66 are contained within the wireless communication unit 36 of FIG. 2. The transmitter 56 is provided for transmitting the series of signals from the CPU 66. The receiver 62 is employed to receive the resonance frequency developed from the LC resonance circuit 60 in resonance operations. The resonance operations are utilized for detecting or identifying an inner temperature of the foodstuff 24.

The resonance frequency detected by the receiver 62 is transferred to the CPU 66 so that the generating resonance frequency is changed to temperature information corresponding to the detected inner temperature. The CPU 66 preliminarily stores information so as to alter the detected resonance frequency to the temperature information.

The temperature information is momentarily indicated in the display 64 which is related to the display 16 of FIG. 1. The key input unit 72 is related to the key input unit 18 of FIG. 1. The key input unit 72 is provided for introducing particular temperature information into the CPU 66. The CPU 677 activates the microwave generation controller 68 for providing microwave energy until the particular temperature information is determined in the CPU 66. According to the difference between the detected temperature information with the aid of the receiver 62 and the particular temperature information stored in the CPU 66, the CPU 66 controls the microwave generation controller 68 to energize the magnetron 70 for driving purposes.

Figure 5:
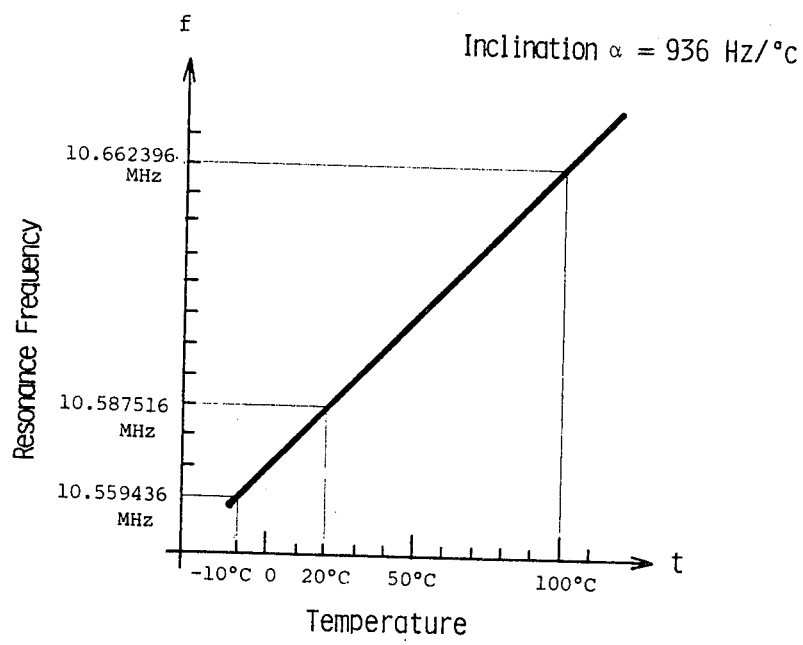
FIG. 5 is a graph showing resonance characteristics of a crystal oscillator incorporated within the sensing probe shown in FIG. 3.

FIG. 5 indicates a graph showing resonance properties of the crystal oscillator 46 depending on a temperature. As obviously noted from the graph of FIG. 5, the crystal oscillator 46 has the resonance frequency accurately proportional to the temperature value. For instance, the crystal oscillator 46 show the resonance frequencies at some temperature values: 10.559436 MHz at $-10°$ C.; 10.587516 MHz at 20° C.; and 10.662396 MHz at 100° C. That is, the inclination $\alpha=936$ Hz/°C. These characteristics of the crystal oscillator 46, that its resonance frequency varies accurately responsive to the particular temperature value, are utilized in the present wireless communication system.

To produce these characteristics, a predetermined volume of a rock crystal is cut so as to change its number of proper vibration dependent on the surrounding temperature. For example, in accordance with this embodiment, YS-cutting is available with a cut angle 5° apart from that of Y-cut plane. The crystal oscillator 46 is incorporated into the resonance circuit to increase the Q of the resonance circuit since Q of the crystal oscillator 46 is very high.

The resonance frequency of the resonance circuit containing the crystal oscillator 46 is partly from that of the crystal oscillator 46 per se at a predetermined number of frequency, say, 1 KHz concerning overall temperature. In the other words, the resonance frequency of the resonance circuit containing the crystal oscillator 46 accurately corresponds to that of the crystal oscillator 46 per se. Therefore, the detected resonance frequency of the resonance circuit inclusive of the crystal oscillator 46 identifies a specific inner temperature of the foodstuff 24.

In place of the crystal oscillator 46, any ceramic oscillator can be utilized inasmuch as the ceramic oscillator may have characteristics that its resonance frequency varies precisely in accordance with the surrounding temperature value. Needless to say, other temperature-responsive elements can be replaced as far as they may have the same characteristics in its resonance operations as the crystal oscillator 46. The resonance operations should not be limited to linear property and non-linear resonance operations are available.

Figure 6:
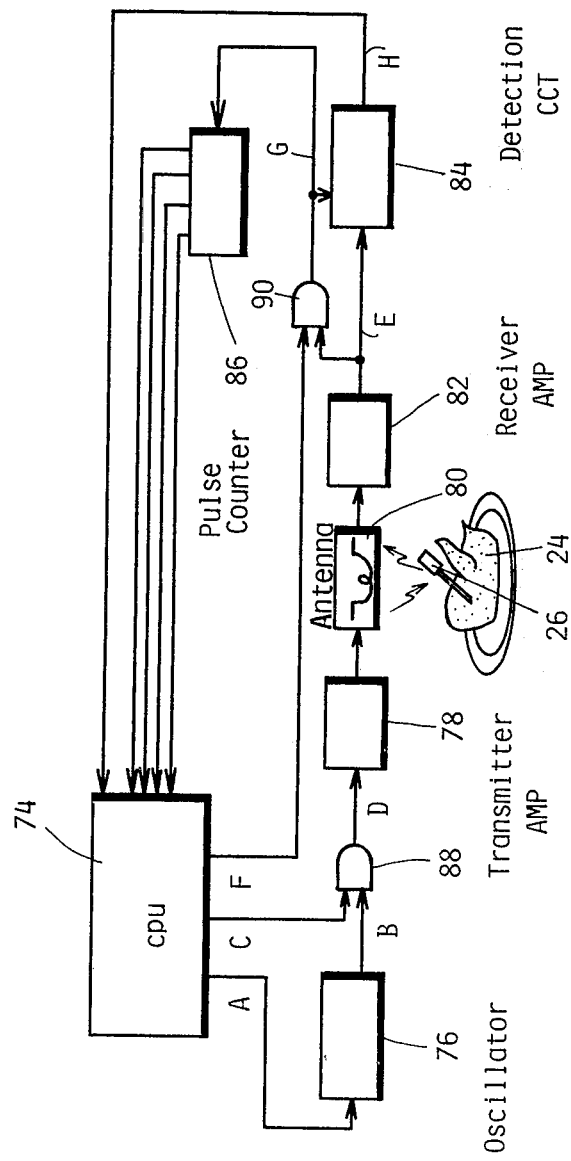
FIG. 6 is a more detailed block diagram of the wireless monitor system similar to FIG. 4.

FIG. 6 shows a more detailed block diagram of the present wireless communication system similar to that of FIG. 4.

With reference to FIG. 6, the wireless communication system comprises a CPU 74, an oscillator 76, a transmitter amplifier 78, an antenna 80, a receiving amplifier 82, a detection circuit 84, a pulse counter 86, two AND gates 88 and 90, and the aforementioned sensing probe 26 inserted into the foodstuff 24.

Figure 7:
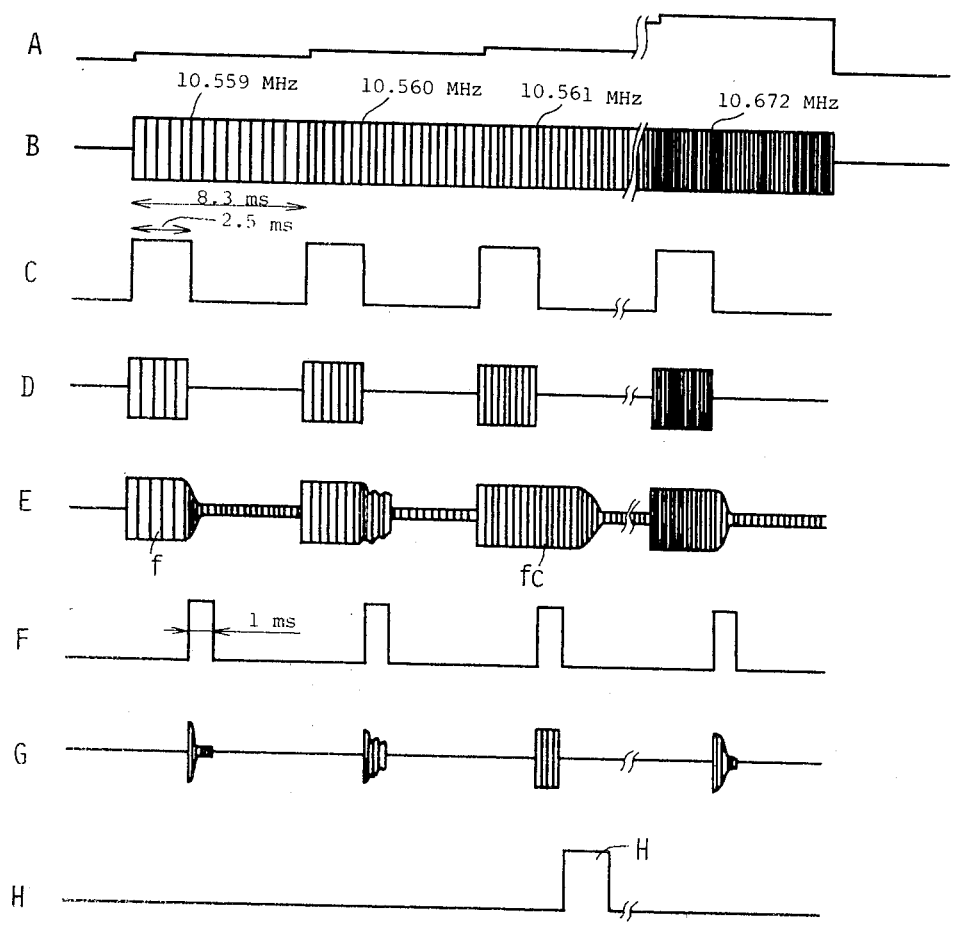
FIG. 7 is a time chart of various signals occurring within circuit elements of the wireless monitor system shown in FIG. 6.

FIG. 7 shows a time chart of various signals occurring within the wireless communication system of FIG. 6. Operation of the circuit elements shown in FIG. 6 will be described with reference to FIG. 7 hereinbelow. Alphabet figures A to H are labeled in FIGS. 6 and 7 so as to identify the signals developing on the respective lines between circuits elements of FIG. 6

The oscillator 76 develops various kinds of signals B, the frequency of which increases accurately by a predetermined degree, e.g., about 1 KHz, each lapse of a certain period of time, say, about 8.3 msec as known as the PLL-VCO system as previously mentioned. The CPU 74 controls the oscillator 76 so as to provide the various kinds of signals B from the oscillator 76 at a predetermined time interval, say, about 8.3 msec. To this end, the CPU 74 develops a series of control signals A at the predetermined time interval. The series of control signals A are introduced into the oscillator 76.

Therefore, as shown in FIG. 7, the frequencies of the signals B vary from 10.559 MHz to 10.672 MHz covering a range from $-10°$ to $100°$ C. referring to FIG. 5.

According to an example of the present invention, the frequencies of the signals B cover decameter waves. A frequency band preferred to the present invention is not limited to the decameter wave and may be changed according to resonance properties of the crystal oscillator 46.

For convenience of the description, it is assumed that the frequencies of the signals B vary by 1 KHz. However, the values of the frequencies of the signals B are selectable to completely agree with the resonance frequencies of the crystal oscillator 46 at the various values of the surrounding temperature as shown in FIG. 5. Even if the frequencies of the signals B vary by 1 KHz as indicated, it is expected that a precision of the detected temperature is in the range of about $\pm 0.1°$ C. since the inclination $\alpha$ of the crystal oscillator 46 is 936 Hz/°C.

A series of pulse signals C are also developed from the CPU 74. Each of the pulse signals C has its width of, say, 2.5 msec. The pulse signals C and the signals B are entered into the AND gate 88 to form discrete signals D each containing the varied frequency therebetween. The thus described discrete signals D are amplified by means of the transmitter amplifier 78 so that the resultant signals are communicated to the sensing probe 26 with the help of the antenna 80. As mentioned above, the sensing probe 26 provides the particular resonance frequency at which the resonance circuit is resonant according to the inner temperature of the foodstuff 24. The particular resonance frequency is determined as the temperature information as follows:

The particular resonance frequency is received and detected by the antenna 80. Output signals from the antenna 80 indicative of the particular resonance frequency are introduced into the receiver amplifier 82 to produce a series of signals E containing frequency components f of the discrete signals D and the other components fc of the resonance frequency activating the resonance circuit. The signals E and pulse signals F developed from the CPU 66 are entered into the AND gate 90 to output signals G which include only the frequency component fc of the resonance frequency. The pulse signals F have a width of about 1 msec.

The detection circuit 84 receives the signals G and the signals E to obtain enable signals H. The enable signals H indicate that the CPU 74 should store the frequency components fc of the resonance frequency which just anticipate the enable signals H, with the help of the pulse counter 86. The enable signals H are introduced in to the CPU 74.

The signals G are applied to the pulse counter 86 so that it counts subsequently the frequency components fc of the resonance frequency therein. The pulse counter 87 develops code information indicative of the resonance frequency. Particular code information is entered into the CPU 74 under the control of the enable signals H. The particular code information is related to the particular resonance frequency at which the resonance operations are caused, enough to determine the inner temperature of the foodstuff 24. The inner temperature is detected by means of the CPU 74 each hour the frequency of the signals B changes. The pulse counter 86 should contain storage portions including the pulse number of at most 10.672 corresponding to the greatest frequencies, 10.672 MHz, of the signals B.

The CPU 74 preliminarily stores information to change the applied code information to the temperature information. The detected temperature information is momentarily indicated in the display (identical to the display 64 in FIG. 4) under the control of the CPU 74. As far as the detected temperature information does not agree with the preset temperature information using the key input (identical to the key input unit 72 in FIG. 4), the CPU 74 activates the microwave generation controller (similar to the microwave generation controller 68 in FIG. 4) so that the microwave energy goes on generating.

When the detected temperature information coincides with the preset information, the CPU 74 prevents the microwave generation controller 68 from developing microwave energy. To ascertain the determination of the temperature information indicative of the inner temperature, it is advantageous that the CPU 74 refrain from restricting the development of microwave energy until the same detected temperature information is repeatedly introduced from the pulse counter 86 to the CPU 74 over several cycles of the signals B starting at 10.559 MHz and ending in 10.672 MHz.

The invention being thus described, it will be obvious that the same may be varied in many ways. Such variations are not to be regarded as a departure from the spirit and scope of the invention, and all such modifications are intended to be included within the scope of the following claims.

What is claimed is:

1. Wireless temperature sensing means for monitoring a temperature within a cooking apparatus, comprising:
   transmitter means for propagating electromagnetic waves within said cooking apparatus over a range of selectively variable frequencies, the said frequencies varying by predetermined increments upon the respective lapses of corresponding predetermined increments of time over which given discrete frequencies exist;

resonant circuit means having a resonant frequency variable linearly in accordance with a monitored temperature value in said cooking apparatus and being devoid of a source of power for selectively responding to a particular frequency of said given discrete frequencies of said propagated electromagnetic waves which is representative of said monitored temperature value and repropagating a response wave having that particular frequency over a subsequent interval of time; and detection means, responsive to said response wave over a sampling interval coincident with said subsequent interval of time for determining said particular frequency as a measure of monitored temperature value.

2. The wireless temperature sensing means of claim 1, wherein said resonant circuit means comprises oscillator element means having a resonant frequency varying linearly in response to variations in monitored temperature value in combination with inductance and capacitance tuning means for maximizing the response of said resonant circuit means to said particular frequency of said propagated electromagnetic waves.

3. The wireless temperature sensing means according to claim 2, wherein said oscillator element means is constructed of a material selected from the group consisting of crystal and ceramic having resonant frequencies linearly variable with respect to temperature.

4. The wireless temperature sensing means of claim 1, wherein said detection means includes:

gated frequency counter means, enabled over said sampling interval, for providing a count representative of said particular frequency; and means responsive to said count for providing an output signal representing said monitored temperature value.

5. The wireless temperature sensing means of claim 4, which further includes display means responsive to said output signal for displaying said monitored temperature value.

6. The wireless temperature sensing means according to claim 4 further comprising control means responsive to said output signal for controlling said cooking apparatus.

7. The wireless temperature sensing means according to claim 6, wherein said control means comprises:

power source means for supplying power to said cooking apparatus; and power control means for controlling the power supplied from said power source means to said cooking apparatus.

8. The wireless temperature sensing means according to claim 7, which further comprises display means responsive to said output signal provided by said detection means for displaying said monitored temperature value.

9. The wireless temperature sensing means according to claim 7 or 8, wherein said control means further comprises: input means for introducing information representing a desired temperature of said cooking apparatus into said control means;

storage means for retaining said desired temperature information; and comparing means for determining the difference between said desired temperature and said monitored temperature for providing a power control signal to said power control means in the absence of said difference to terminate the supply of power from said power source means to said cooking apparatus.

10. The wireless temperature sensing means of claim 1, wherein said resonant circuit means comprises oscillator element means having a resonant frequency varying linearly in response to variations in monitored temperature value in combination with inductance and capacitance tuning means for maximizing the response of said resonant circuit means to said particular frequency of said propagated electromagnetic waves; and wherein said detection means includes:

gated frequency counter means, enabled over said sampling interval, for providing a count representative of said particular frequency; and means responsive to said count for providing an output signal representing said monitored temperature value.

11. The wireless temperature sensing means of claim 10, which further includes display means responsive to said output signal for displaying said monitored temperature value.

12. The wireless temperature sensing means according to claim 1, wherein said cooking apparatus is a microwave oven.

13. Cooking control means for detecting the difference between a monitored cooking temperature value and a preset cooked temperature value of a foodstuff in a cooking apparatus and controlling said apparatus as a function of the said difference in temperatures, comprising:

transmitter means for propagating electromagnetic waves within said cooking apparatus over a range of selectively variable frequencies, the said frequencies varying by predetermined increments upon the respective lapses of corresponding predetermined increments of time over which given discrete frequencies exist;

resonant circuit means having a resonant frequency variable linearly in accordance with a monitored temperature value in said cooking apparatus and being devoid of a source of power for selectively responding to a particular frequency of said given discrete frequencies of said propagated electromagnetic waves which is representative of said monitored temperature value and repropagating a response wave having that particular frequency over a subsequent interval of time; and detection means, responsive to said response wave over a sampling interval coincident with said subsequent interval of time for determiming said particular frequency as a measure of said monitored temperature value;

said detection means providing an output signal representative of said monitored cooking temperature value;

comparison means responsive to said output signal and including a reference parameter representative of said preset cooked temperature value for comparing said monitored cooking temperature value with said preset cooked temperature value for generating a representative temperature difference signal therebetween; and control means responsive to said temperature difference signal for controlling the cooking of said foodstuff by said cooking apparatus as a function of said temperature difference.

14. The wireless temperature sensing means of claim 13, which further includes display means responsive to said output signal for displaying said monitored cooking temperature value.

15. The cooking control means in accordance with claim 13 or 14, wherein said resonant circuit means comprises oscillator element means having a resonant frequency varying linearly in response to variations in monitored temperature value in combination with inductance and capacitance tuning means for maximizing the response of said resonant circuit means to said particular frequency of said propagated electromagnetic waves.

16. The cooking control means in accordance with claim 13 or 14, wherein said detection means includes:
   gated frequency counter means, enabled over said sampling interval, for providing a count representative of said particular frequency; and
   means responsive to said count for providing an output signal representing said monitored temperature value.

17. The cooking control means in accordance with claims 13 or 14, wherein said resonant circuit means comprises oscillator element means having a resonant frequency varying linearly in response to variations in monitored temperature value in combination with inductance and capacitance tuning means for maximizing the response of said resonant circuit means to said particular frequency of said propagated electromagnetic waves; and
   wherein said detection means includes:
   gated frequency counter means, enabled over said sampling interval, for providing a count representative of said particular frequency; and
   means responsive to said count for providing an output signal representing said monitored temperature value.

18. The cooking control means in accordance with claim 13 or 14, wherein:
   said comparison means further comprises input means for introducing a desired preset cooked temperature reference parameter of said foodstuff therein; and
   said control means de-energizes said cooking apparatus when said temperature difference approaches zero.

* * * * *